United States Patent [19]
Harris

[11] 3,893,361
[45] July 8, 1975

[54] APPARATUS FOR SHEARING SHEET MATERIAL

[76] Inventor: Roger Elwin Harris, 174, Plymouth Rd., Redditch, Worcester, England

[22] Filed: May 31, 1973

[21] Appl. No.: 365,559

[30] Foreign Application Priority Data
May 31, 1972  United Kingdom............... 25531/72

[52] U.S. Cl...................... 83/375; 83/394; 83/467; 83/615; 83/622; 83/628; 83/638; 83/696; 83/700
[51] Int. Cl............................ B26c 7/02; B26d 7/16
[58] Field of Search............ 83/620, 622, 615, 394, 83/268, 419, 421, 467, 638, 375, 700, 699, 696, 628; 214/1.6

[56] References Cited
UNITED STATES PATENTS

| | | | |
|---|---|---|---|
| 3,282,141 | 11/1966 | Gautron............................ | 83/620 X |
| 3,308,702 | 3/1967 | Klein................................. | 83/622 X |
| 3,483,779 | 12/1969 | Forthmann, Jr................... | 83/620 X |
| 3,616,719 | 11/1971 | Tassle ............................... | 83/620 |
| 3,662,635 | 5/1972 | Yabuta............................. | 83/467 X |

Primary Examiner—Frank T. Yost
Attorney, Agent, or Firm—Cushman, Darby & Cushman

[57] ABSTRACT

There is disclosed an apparatus for shearing sheet material comprising two simultaneously movable blades with their cutting edges set substantially at right angles to one another, and two static blades whose cutting edges are also set substantially at right angles to one another to co-operate with each of said movable blades, there being provided power operable means for moving said movable blades towards said static blades to cut material, moved into the apparatus between said blades, in two directions at right angles in a single cut, in which there is provided a back gauge adjustable in two perpendicular planes, each parallel to a respective plane of said movable and static blades, to gauge two perpendicular edges of said material, said movable blades then being power driven towards said static blades to cut said material in two directions at right angles in a single cut to form a substantially square cut blank of material. The accuracy of dimension of the cut blank is equivalent to that attained with convention shears using individual manipulation in two directions and the apparatus can be incorporated in a shear line to enable the production of accurately cut blanks on a continuous basis from coiled sheet material.

9 Claims, 9 Drawing Figures

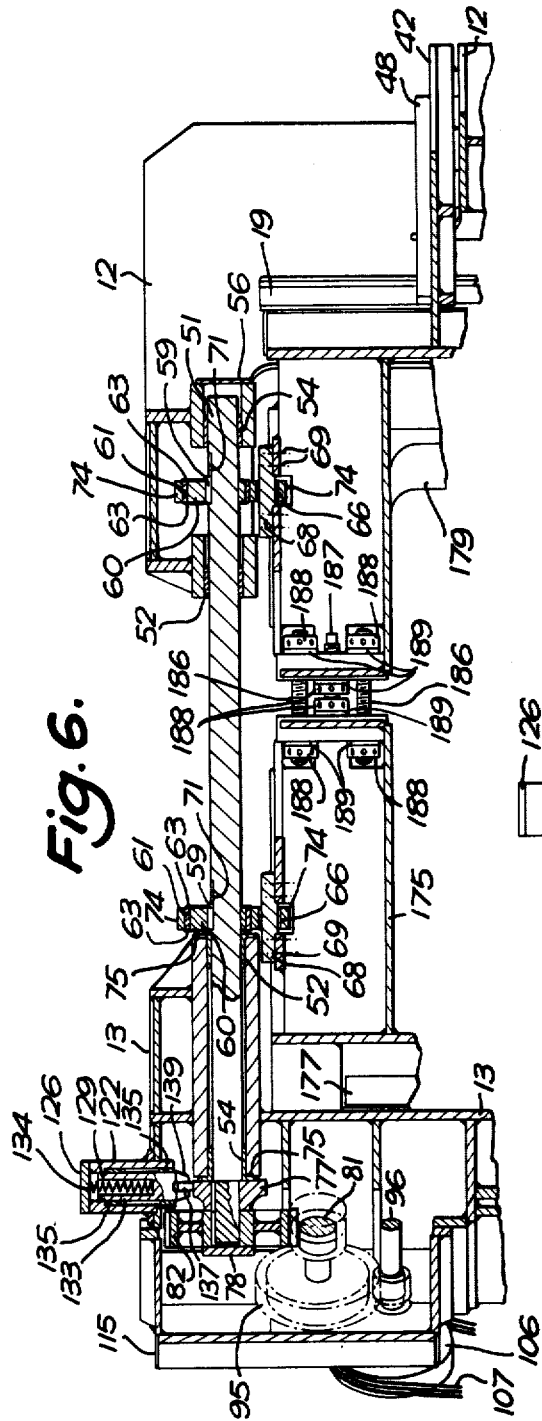
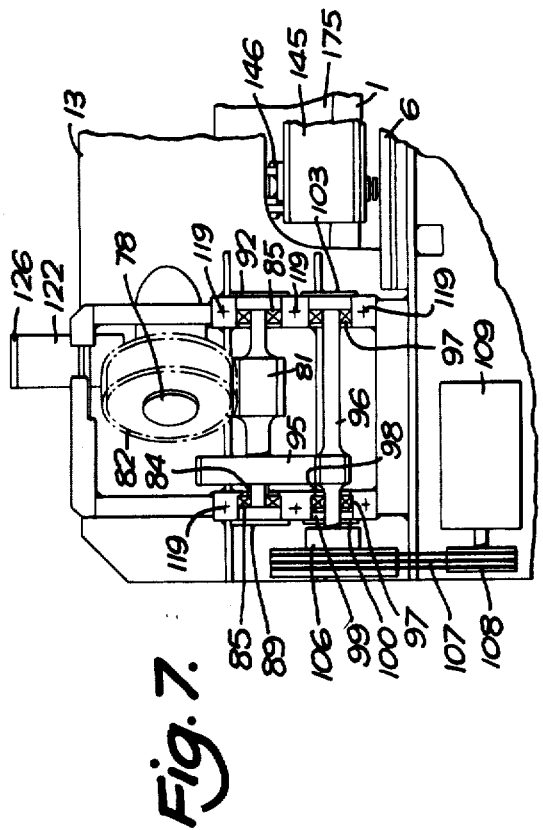
Fig. 6.
Fig. 7.

APPARATUS FOR SHEARING SHEET MATERIAL

FIELD OF THE INVENTION

The invention relates to apparatus for shearing sheet material.

DESCRIPTION OF THE PRIOR ART

The production of articles incorporating sheet material, both of metal and other substances, very often requires the sheet material to be cut into blanks of rectangular shape. Hitherto, such blanks have either been cut individually to high dimensional accuracy on a conventional shear, or with less accuracy but at high production rates of shear lines which combine conventional shears, either flying or static, with other equipment in various arrangements. For example, slitting machines may be incorporated with shears to produce blanks of limited accuracy on a continuous basis from coils of sheet material.

It has been proposed to use a single shear to cut the material in two perpendicular directions, and British Patent Specification No. 1,027,857 describes and claims such a shear for cutting up scrap and the like. The specification discloses an apparatus having two moving blades, set at right angles to one another to cut the material in two directions substantially simultaneously in a single working step. The apparatus of British Patent Specification No. 1,027,857 would however be unsuitable for cutting precision blanks: the present invention seeks to provide an apparatus which could be used to produce such blanks.

SUMMARY OF THE INVENTION

The invention provides, in an apparatus for shearing sheet material comprising two simultaneously movable blades with their cutting edges set substantially at right angles to one another, and two static blades whose cutting edges are also set substantially at right angles to one another to co-operate with each of said movable blades, there being provided power operable means for moving said movable blades towards said static blades to cut material, moved into the apparatus between said blades, in two directions at right angles in a single cut, the improvement comprising the provision in such apparatus of a back gauge adjustable in two perpendicular planes, each parallel to a respective plane of said movable and static blades, to gauge two perpendicular edges of said material, said moving blades then being power driven towards said static blades to cut said material in two directions at right angles in a single cut to form a substantially square cut blank of material.

BRIEF DESCRIPTION OF THE DRAWING

FIG. 6 is a part section along the line F—F of FIG. 1;

FIG. 7 is a part view on arrow G of FIG. 1, with the gear box cover of the apparatus removed;

DESCRIPTION OF THE PREFERRED EMBODIMENT

This specification describes an apparatus for shearing sheet material, called the Elwin Harris Shear, which can be incorporated in a shear line (see FIG. 9) to enable the production of accurately cut blanks on a continuous basis from coiled sheet material.

Figure 1:
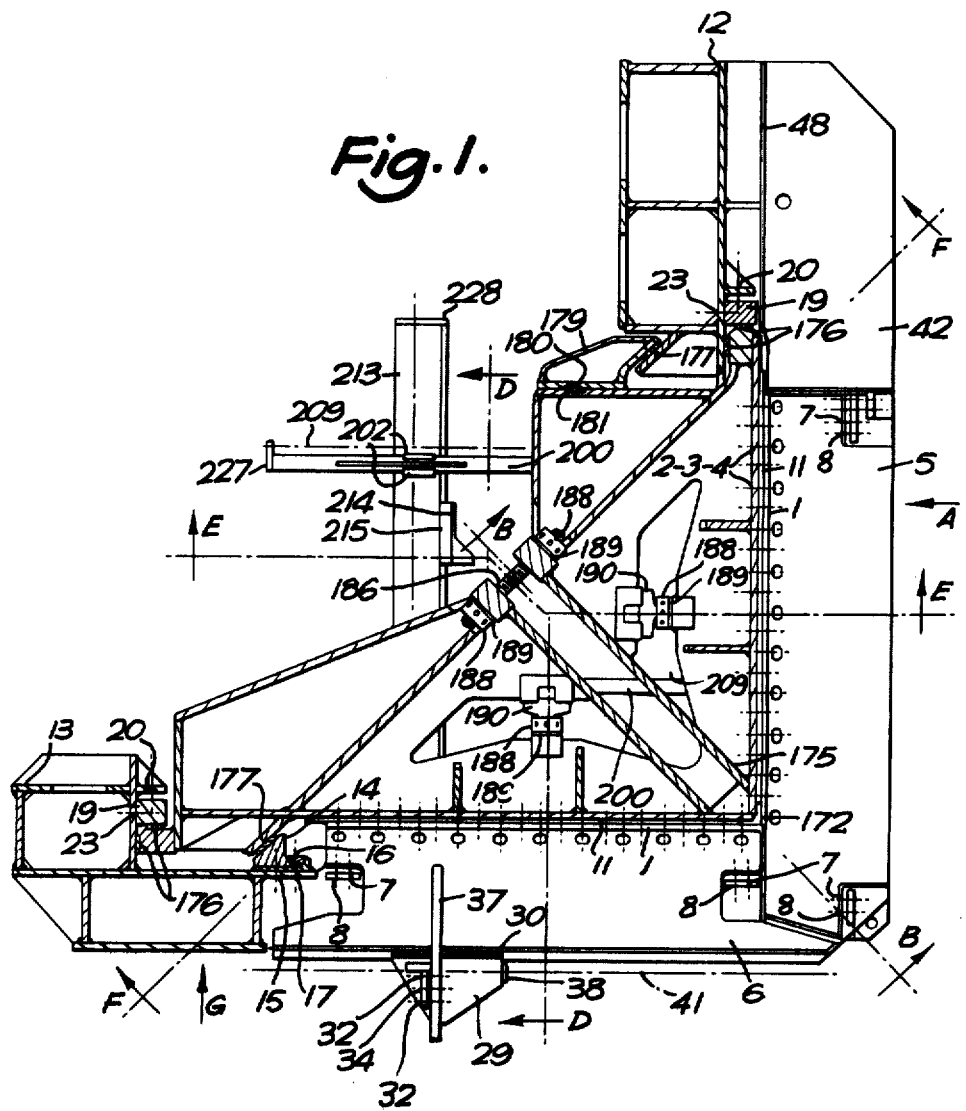
FIG. 1 shows in section a plan of an apparatus, embodying the invention, for cutting precision blanks from sheet material, the section being taken along line C—C in FIG. 3 of the accompanying drawings.

The shear includes a static frame made up of two substantial C-frames 12, 13 set vertically and joined to form a right angle in plan view with their haunches being set away from the junction. The lower portion of each frame incorporates a normal shear bed with two static cutting plates 1 and tables 5, 6 set horizontally. The position of each table is adjustable relative to the bed by means of push-pull screw jacks 7, 8 and the static blades are similarly adjustable and lockable with clamping screws 2, 3, 4. The haunches of each frame incorporate slideways which are arranged so that their axes are inclined by a small amount from the vertical; this ensures that the moving cutting blades 11 of the shear move apart from the cut material after making the cut. The slideways 14, 19 are adjustable as shown in FIG. 1 to ensure proper working clearances before and after wear.

Figure 3:
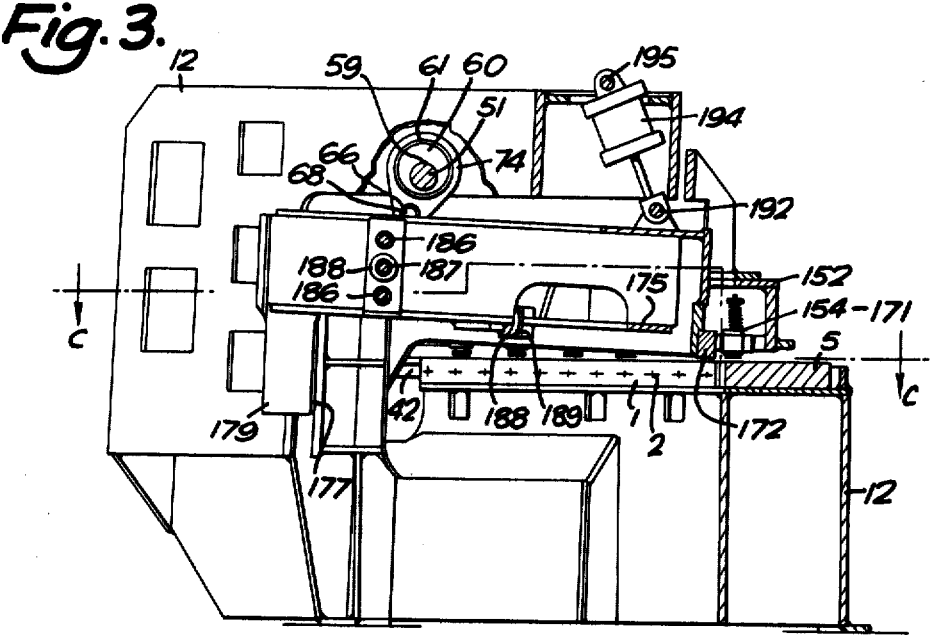
FIG. 3 is a section along the line B—B of FIG. 1, with the back gauge of the apparatus removed.

The shear incorporates two similar cutting blades 11, carried on a moving beam 175, which are set at right angles in plan view (FIG. 1) but are raked relative to the static blades 1 when the beam 175 is installed in place on the slideways (FIG. 3). At the junction of these two blades 11 is installed a separate blade segment 172 which acts as a punching tool at the start of the cut. The seatings of all moving blades 11 are slightly inclined relative to the line of motion. The squareness of the cuts is adjustable by means of two tension screws 186 and collars 188, and one compression screw 187 and the collar 188, located at the back of the beam 175. In addition, each moving blade 11 can be bowed relative to its corresponding static blade 1, by means of a screw jack 190 set behind the blade at its mid-length, to give optimum clearance between moving and static blades for high quality shearing. The whole beam incorporates sliding surfaces 176, 177 which mate with the slideways in the C-frames 12, 13. One slideway 179 is removable to enable the beam 175 to be installed into the frames 12, 13; it is also adjustable by means of two cooperating tapered keys 180, 181 to ensure proper working clearance.

Motion is imparted to the moving beam by means of an overhead crankshaft, cams and links. The crankshaft 51 rotates in plane bearings 52, 54 incorporated in the C-frames 12, 13 and is driven through gears (FIGS. 6 and 7) via a clutch and brake unit 106 from a flywheel which is driven by an electric motor 109. The drive can be controlled to operate in single cycles or continuously. Downward cutting motion of the beam 175 is restrained by an air balancing cylinder 194 pivoted at 195 to the static frame and at 192 to the beam. This imparts an upward force on the beam to counteract its cantilevered weight and to ensure smooth motion.

The shear incorporates hydraulic hold down jacks 154 spaced regularly and close to the cutting line to prevent any tendency of the material to move during cutting. A master hydraulic cylinder 122 is actuated by a cam 77 on the crankshaft 51 via a roller follower 137 so that pressurized oil passes via an adjustable relief valve 133 to each jack 154 immediately before the cut, holding the material by friction to the bed. Immediately after the cut, pressure is released. Each line of jacks 154 is installed in a beam 145 which can be unscrewed and swung upwards on pivots 146; this enables easy maintenance and access for blade changing.

Figure 4:
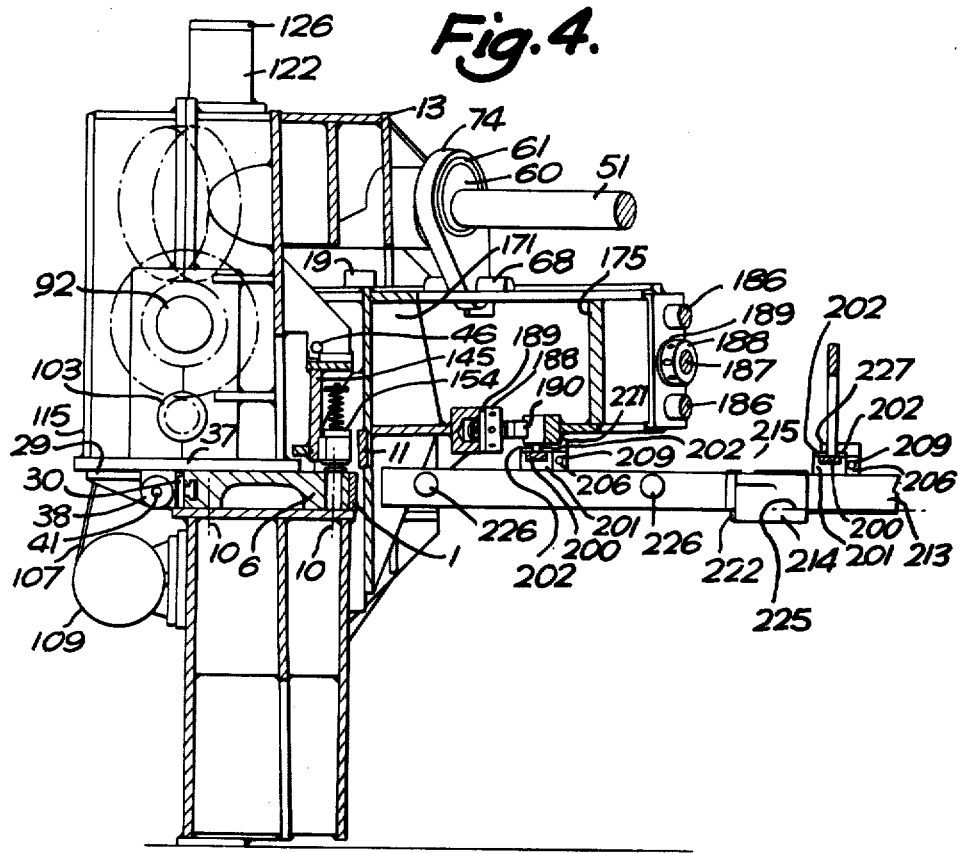
FIGS. 4 and 5 are sections along the lines D—D and E—E, respectively, of FIG. 1.
Figure 5:
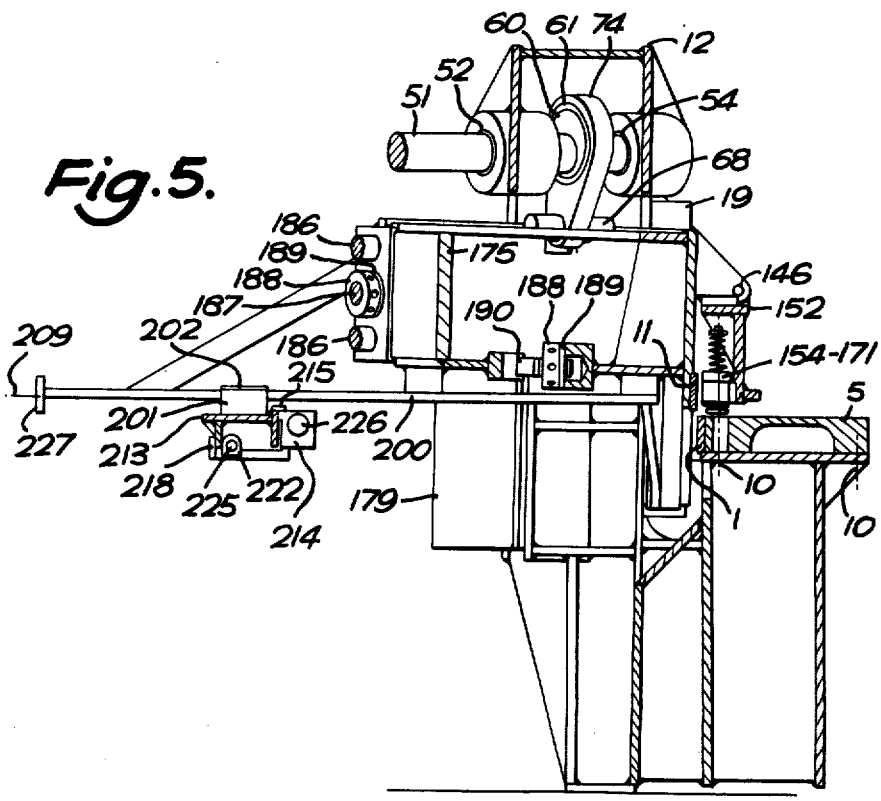

Various gauges are installed which enable the material to be correctly and easily positioned before making the cut. The left hand edge (when viewed as in FIG. 1) of the material is guided by a strip 37 in front of the machine. The squareness of this strip is adjustable by push (32) and pull (34) screws. It is clamped to a small bracket 29 which is adjustable laterally via a hand operated lead screw 41 and guided from a T-slot in the front table 6, the bracket itself being clamped in a predetermined correct position. A back gauge is also provided. One part of the gauge is an elongate member 213, the inner edge of which gauges the left-hand edge (as viewed in FIG. 1) of the incoming material, and is adjustable towards and away from the table 5 along parallel slides 200 by hand-operated lead screw 209. The elongate support 213 is hung from the slides 200 by a pair of slide blocks 201, each of which is held captive by a pair of plates 202 and moved by the action of the lead screws 209 turning in screw boxes 206 which are fixed to the slide box 201. All these details will become apparent from a study of FIGS. 1, 4 and 5. It will also be seen from these figures that slides 200 are secured to the beam 175 carrying the movable blades 11. The slides, and therefore the support 213, thus move up and down with the movable blades when the machine is operated.

The other part of the gauge is constituted by a gauge block 214, the gauging face of which projects at right-angles to the longitudinal axis of the support 213. The block 214 can slide the length of the support 213, held captive by a plate 215 at the top and another 218 at the back and moved by the action of a lead screw 225 turning in a screw box 222 which is fixed to the block 214. The support 213 and its gauge block 214 are each adjusted by their respective hand-operated lead screws 209 and 225 and are clamped in their correct positions prior to making a cut.

Figure 2:
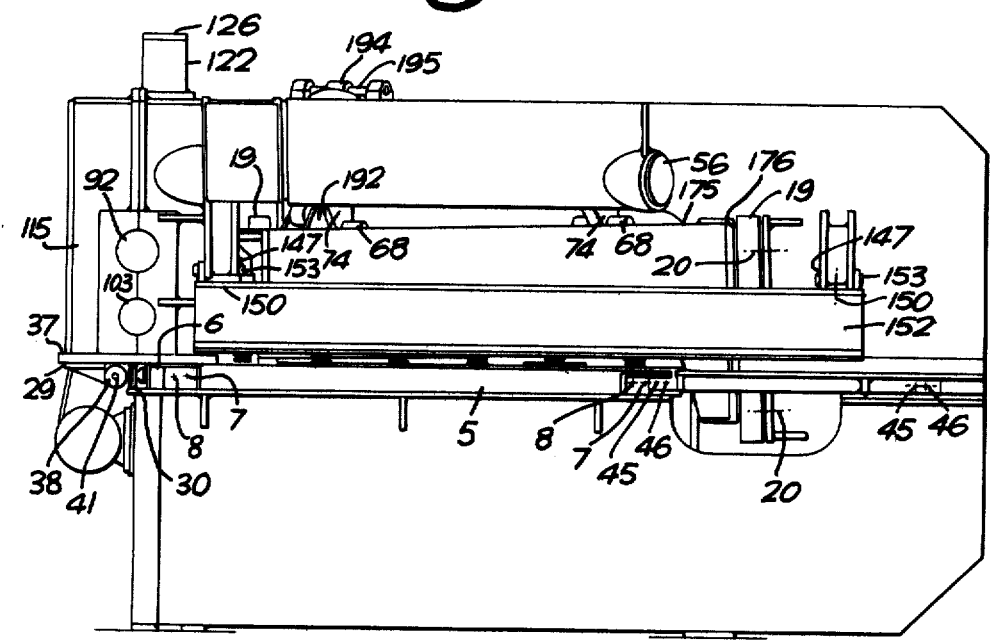
FIG. 2 is a view on arrow A of FIG. 1.

A further guide 48 is incorporated in a gauging table 42, which is located as a continuation of the side table 5. This guides the already cut edge of the material inbetween cuts. The position of the table 42 is adjustable horizontally so that the guide strip 48 is in exact alignment with the line of cut in the direction of feed. Adjustment is by means of two sets of push pull screws 45, 46 (FIG. 2) and the table is clamped in correct position by four further screws (not shown in the drawings).

In addition, the machine incorporates other items (not shown in the drawings) which are usually fitted to a shear, such as lubrication systems, air and hydraulic piping, electrical controls, finger guards and delivery chutes.

Figure 8:
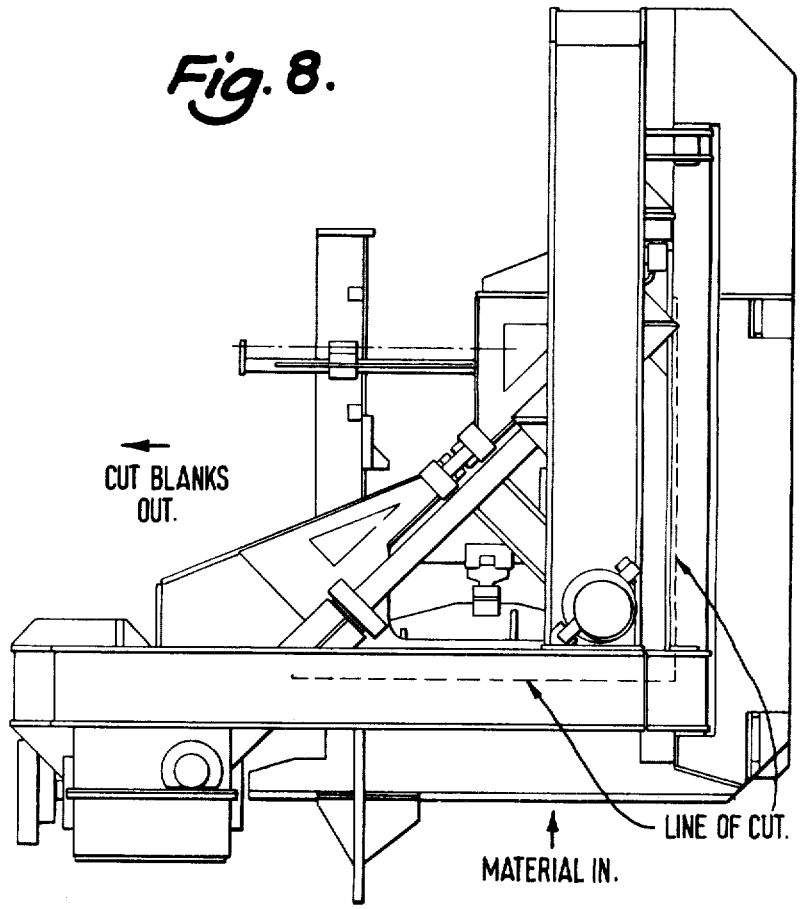
FIG. 8 shows the apparatus of FIGS. 1 to 7 in plan.
Figure 9:
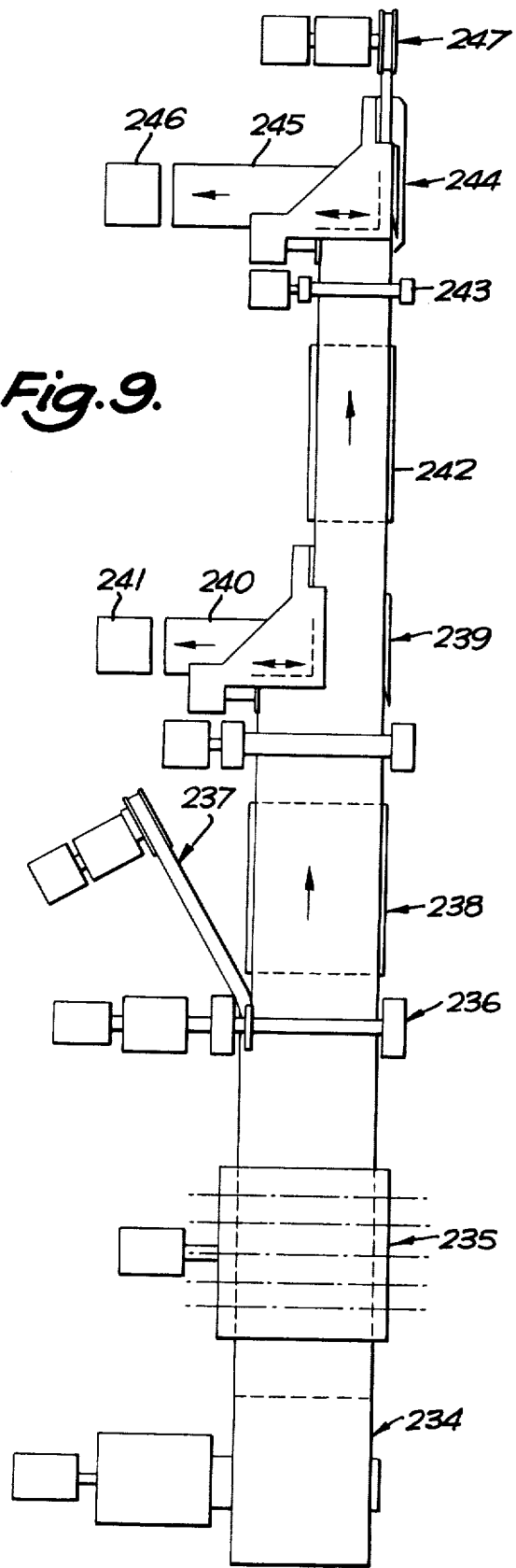
FIG. 9 shows diagrammatically a shear line for the production of precision blanks of sheet material, incorporating two of the apparatus shown in FIGS. 1 to 8.

In use, the machine is operated by a foot switch or probes (226) and as sheet material fed into it in the direction indicated in FIGS. 8 and 9. The material is uncoiled from a motor driven payoff reel 234, passes over a levelling table 235 and is trimmed along its left hand edge (FIG. 9) by a conventional rotary shear 236. A scrap coil 237 reels in the trimmed portion, and the material passes on via a hump table or pit 238 through pinch rolls to an Elwin Harris Shear 239 of the kind herein described. The shear operates with a single cutting action similar to that of a conventional shear, but with two cuts being undertaken simultaneously at right angles to each other, and the material taken out of the notch from the left hand front corner (as viewed in FIG. 9) of the material constitutes the finished blank. This falls behind the shear onto a conveyor 240 and piler 241.

The remaining material passes through the Elwin Harris Shear 239 over a further hump table 242 and through a second set of pinch rolls 243 to another Elwin Harris Shear 244. Here it is again cut in the manner just described. The cut blanks are conveyed at 245 and piled at 246, and the narrow band of material remaining is reeled in by a scrap coiler 247 at the end of the line.

The accuracy of dimension of the cut blank is equivalent to that obtained with a conventional shear using individual manipulation in two directions, and a shear embodying the invention enables accurate blanks to be cut with ease and speed, since less manipulation between cuts and fewer operations are necessary than with conventional shears.

The machine described and illustrated is intended for cutting medium sized sheet metal blanks of moderate gauge. The same principles would apply with a machine to cut larger or smaller blanks in other gauge materials, with suitable structural modifications. For example, magnetic sheet supports could be fixed to the table to hold magnetic material of light gauge for cutting; a very large version of the Elwin Harris Shear could be envisaged for cutting heavy plates at the delivery end of a plate mill, and in such a case the main frame could be constructed of reinforced or prestressed concrete. Operation could be hydraulic and gauging could be by optical methods. Other forms of apparatus falling within the scope of the invention as defined by the following claims will be apparent to those skilled in the art.

I claim:

1. In an apparatus for shearing sheet material comprising two simultaneously movable blades with their cutting edges set substantially at right angles to one another, and two static blades whose cutting edges are also set substantially at right angles to one another to co-operate with each of said movable blades, and power operable means for moving said movable blades towards said static blades to cut material, moved into the apparatus between the said blades, in two directions at right angles in a single cut, the improvement comprising the provision of such apparatus of a back gauge adjustable in two mutually perpendicular planes, each parallel to a respective plane of said movable and static blades, to gauge two mutually perpendicular edges of said material prior to said movable blades being power driven towards said static blades to cut said material in two directions at right angles in a single cut to form a substantially rectangular cut blank of material, wherein said back gauge comprises an elongate support, one longitudinal edge of which gauges one edge of the material, and a member slidable therealong one face of which member projects at right angles to said support to gauge the other edge of the material, said support being secured to one of said movable blades within the angle formed by both movable blades for movement therewith along a cut.

2. The improvement of claim 1 in which said static blades are supported on a frame comprising two substantially C-shaped frames joined to form a right angle with their haunches being set away from the junction and in which said haunches incorporate slideways carrying said movable blades, the axes of said slideways being inclined by a small amount from the axes of said haunches so that said movable blades move apart from the cut material after making a cut.

3. The improvement of claim 2, in which there is installed at the junction of said movable blades a further blade segment which acts as a punching tool at the start of the cut.

4. The improvement of claim 3, wherein the squareness of cut is adjustable by means of two tension screws and collars, and one compression screw and collar, located on a member joining the extremeties of said movable blades and operable to vary the angle between said blades by moving said extremities towards or away from each other.

5. The improvement of claim 4, wherein each said movable blade can be bowed relative to its corresponding static blade by means of a screw jack set behind said movable blade at its mid-length.

6. The improvement of claim 5, wherein motion is imparted to said beam by means of a power driven crankshaft, mounted in bearings in said frame and connected to said beam via an eccentric such that rotation of said crankshaft causes reciprocation of said beam.

7. The improvement of claim 6, wherein cutting motion of said beam is restrained by an air balancing cylinder pivoted at one end to said beam and at the other end to said frame, said cylinder when operated counteracting the weight of said beam to ensure smooth cutting motion.

8. The improvement of claim 7, wherein said material is held during a cut by a plurality of hydraulic hold down jacks fed from a master hydraulic cylinder, said hydraulic cylinder being actuated by an eccentric cam on said crankshaft so that pressurized oil passes to each jack immediately before a cut and said pressure of said oil is released immediately after the cut.

9. The improvement of claim 8, wherein said back gauge incorporates shearing probes.

* * * * *